Aug. 8, 1950  A. C. COUTANT  2,518,288
STEERABLE MOTION PICTURE CAMERA STAND
Original Filed Feb. 6, 1946
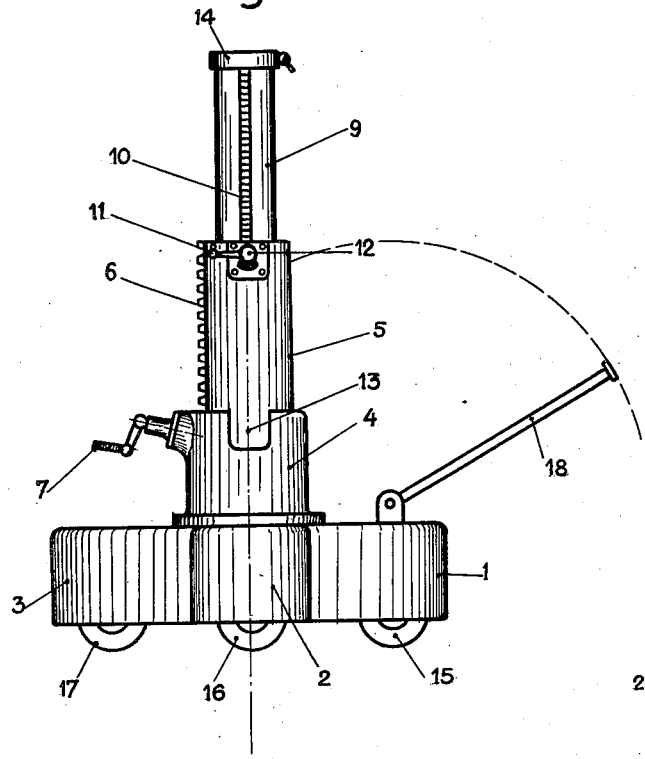
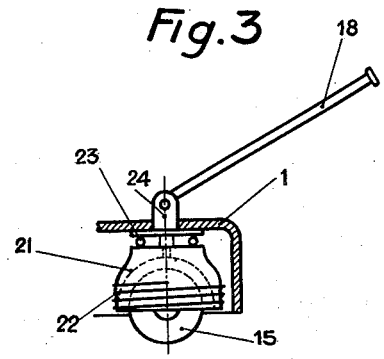
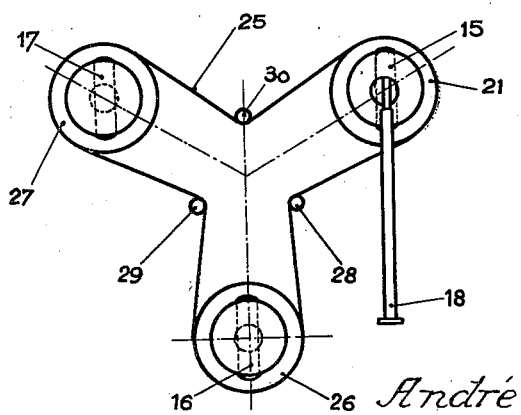
Inventor
André Clément Coutant
By Thomas H. West, Atty.

Patented Aug. 8, 1950

2,518,288

UNITED STATES PATENT OFFICE 2,518,288

STEERABLE MOTION-PICTURE CAMERA STAND

André Clément Coutant, Paris, France, assignor to Suzanne, Rosalie Coutard, born Mathot, Paris, France Original application February 6, 1946, Serial No. 645,870, now Patent No. 2,484,982, dated October 18, 1949. Divided and this application January 31, 1947, Serial No. 725,427. In France August 13, 1943

Section 1, Public Law 690, August 8, 1946
Patent expires August 13, 1963

1 Claim. (Cl. 280—48)

The present invention relates to a trolley mounted stand for motion picture cameras. Stands of this kind generally comprise three wheels and steering means controlling the direction of same. Said steering means are generally constituted by an orientable lever secured to the upper end of a vertical shaft pivoted on the frame of the trolley and the lower end of which carries a central pinion meshing with a series of pinions controlling the direction of the wheels and maintaining said wheels parallel to each other. This device involves several drawbacks: the wheels can be orientated through 180° due to the disposition of the steering lever; the pinions form a source of noise which is not acceptable in the case of talking moving pictures; due to the spacing of the wheels, the size and the weight of the pinions are very important. In another known embodiment of a rolling stand for motion picture cameras, the wheels of the trolley are provided with horizontal sprocket wheels connected by a chain driven by a central sprocket wheel secured to a vertical shaft provided as in the preceding case with a 180° orientable steering lever; this device involves the same drawbacks as the first, except the weight which can be slightly reduced.

The present invention has for object the eliminating of the above mentioned drawbacks of the known art. According to the invention each of the three wheels of the trolley is capped by a hemispherical bell pivotally mounted at the end of each of the three arms of the stand, each bell being provided with an approximately horizontal spiral groove having a plurality of convolutions, and the three bells being connected, in positions in which the three wheels are parallel, by an endless cable which is guided by three rollers and which winds several turns in the groove of each of said bells, said cable being fixed at one point in said groove and a steering lever being pivotally mounted in a clevis forming the end of the pivot of one of the bells.

By way of example, one embodiment of a trolley mounted stand according to the invention is described hereinafter and illustrated in the accompanying drawing.

Fig. 1 shows the stand in elevation.

Fig. 2 is a plan view diagrammatically showing the steering and control device of the wheels.

Fig. 3 is a detailed view of a part of said device.

This application is a division of my copending application No. 645,870, filed February 6, 1946, and now Patent No. 2,484,982, October 18, 1949.

The invention is hereinafter described as applied to an elevating stand for motion picture cameras forming the subject matter of my copending application No. 645,870 and comprising a frame formed by three arms 1, 2, 3 and carrying a central stationary sleeve 4 and two telescopic tubes 5 and 9 sliding within one another and within the sleeve 4, said tubes being provided with racks 6 and 10 and control means, meshing with said racks and actuated by cranks 7 and 11 being provided at the top of the sleeve 4 and of the tube 5 respectively. The cranks 7 and 11 are angularly shifted the one with respect to the other and notch 13 is provided at the top of the sleeve 4 for accommodating the control means 12 mounted on tube 5 in its lowered position.

Each of the three wheels 15, 16, 17 (Fig. 3) is mounted in a hemispherical bell 21 which is provided on the outside with an approximately horizontal spiral groove 22 formed by two or three convolutions. The vertical pivot of said bell is mounted in a ball bearing 23 which is secured to the corresponding arm 1 of the trolley. The bell pivot of the wheel 15 carries a clevis 24 in which is pivoted the steering lever 18. Owing to this mounting, the lever 18 can be used to orientate the wheel 15 and, after this operation, can be moved downwards on one side or the other into the one of the two positions in which it projects least beyond the trolley. An endless cable 25 connects the three bells 21, 26, 27 of the three wheels by winding itself several turns on the spiral of each of them. It is fixed at one point by means of a cable gripping device, not shown, on the periphery of each of the bells, the mounting being effected in such a manner that the planes of the three wheels are parallel with each other and with the lever 18. The cable 25 is held inside the three-armed trolley by the three guide rollers 28, 29, 30. By means of this device, the lever 18 enables the three wheels to be oriented in any direction and the stand to be pushed, in order to move it in that direction.

The possibility of moving the lever 18 downwards on one side or the other about its pivot in the clevis 24 will enable, in numerous cases, the bulk of the stand to be decreased, so that said stand can, for example, be pushed further against an obstacle such as a partition, or into a corner of the scenery where it could not have been placed if the lever 18 had not been able to swing downwards in this manner.

The control of the direction of the wheels by means of an endless cable which is wound several turns on the bell of each wheel and is connected to each of said bells at one point, together with the possibility of swinging the control lever downwards, enable the direction of the movement to be varied continuously through at least 360°.

This cable control device is strictly silent, which is very important for taking pictures accompanied by sound recordings.

The trolley mounted stand thus constituted is of a particularly simple and cheap construction.

The steering device according to the invention can naturally be used with the same advantages on trolley mounted stands of any kind other than the telescopic elevating stand hereinbefore described and shown in Fig. 1 by way of example.

What I claim is:

A trolley mounted elevatable camera stand having a plurality of supporting wheels rolling on horizontal pins, an endless cable for interlocking the wheels in a relative position corresponding to the parallelism of the wheels and a roller mounted under the trolley, between two successive wheels to maintain this cable under tension, in combination with a bell-shaped cap mounted on each of said pins and pivotally supported under said trolley and spiral grooves on each of said bell shaped caps to guide said cable, one of said caps being provided at its upper end with a clevis passing through the trolley and pivotally supporting a wheel steering lever of sufficient length to be within an easy reach of the cameraman's hand at the greatest elevation of the stand.

ANDRÉ CLÉMENT COUTANT.

REFERENCES CITED

The following references are of record in the file of this patent:

UNITED STATES PATENTS

| Number | Name | Date |
|---|---|---|
| 1,539,936 | Clark | June 2, 1925 |
| 2,012,628 | Howell | Aug. 27, 1935 |
| 2,173,950 | Parkhill | Sept. 26, 1939 |
| 2,200,736 | Bedford et al. | May 14, 1940 |
| 2,228,247 | Cunningham | Jan. 14, 1941 |
| 2,235,045 | Ronning | Mar. 18, 1941 |
| 2,388,692 | House | Nov. 13, 1945 |
| 2,423,206 | Stokes | July 1, 1947 |

FOREIGN PATENTS

| Number | Country | Date |
|---|---|---|
| 29,130 | Great Britain | A. D. 1912 |